United States Patent
Mochizuki

(10) Patent No.: US 11,633,266 B2
(45) Date of Patent: Apr. 25, 2023

(54) HOLDING ATTACHMENT FOR DENTURE ABUTMENT

(71) Applicant: DGSHAPE Corporation, Hamamatsu (JP)

(72) Inventor: Ryusuke Mochizuki, Hamamatsu (JP)

(73) Assignee: DGSHAPE CORPORATION, Shizuoka (JP)

(*) Notice: Subject to any disclaimer, the term of this patent is extended or adjusted under 35 U.S.C. 154(b) by 75 days.

(21) Appl. No.: 17/126,281

(22) Filed: Dec. 18, 2020

(65) Prior Publication Data

US 2021/0251728 A1    Aug. 19, 2021

(30) Foreign Application Priority Data

Feb. 14, 2020    (JP) .............................. JP2020-023373

(51) Int. Cl.
  *A61C 13/00* (2006.01)
  *B23B 31/107* (2006.01)
  *A61C 13/16* (2006.01)

(52) U.S. Cl.
  CPC ...... *A61C 13/0004* (2013.01); *A61C 13/0006* (2013.01); *A61C 13/16* (2013.01); *B23B 31/10741* (2021.01)

(58) Field of Classification Search
  CPC . A61C 13/0004; A61C 13/0006; A61C 13/16; A61C 8/005; B23B 31/10741; B23Q 3/062
  See application file for complete search history.

(56) References Cited

U.S. PATENT DOCUMENTS

| 2009/0130634 A1* | 5/2009 | Ganley ................. A61C 13/08 |
| | | 433/206 |
| 2015/0071724 A1 | 3/2015 | Suyama et al. |
| 2020/0038150 A1 | 2/2020 | Ishiwata |

FOREIGN PATENT DOCUMENTS

| DE | 1 215 643 B | 5/1966 |
| JP | 2019-188197 A | 10/2019 |

OTHER PUBLICATIONS

Official Communication issued in corresponding European Patent Application No. 20214138.8, dated May 14, 2021.

* cited by examiner

*Primary Examiner* — Rick K Chang
(74) *Attorney, Agent, or Firm* — Keating & Bennett, LLP

(57) ABSTRACT

A holding attachment includes a holding portion with a round or substantially round columnar hole shape in which a held portion of a material before cutting is inserted and a mounting portion that is mounted on a work mount of a cutting machine. The mounting portion includes at least one pin that is inserted to at least one pin insertion hole provided in the work mount and at least one engagement portion that is engaged with at least one rotation stopper provided in the work mount. A position reference portion of the material before cutting is recessed from a round or substantially round columnar outer peripheral surface of the held portion. The holding portion includes a fitting portion fit to the position reference portion of the material before cutting.

7 Claims, 9 Drawing Sheets

HOLDING ATTACHMENT FOR DENTURE ABUTMENT

CROSS REFERENCE TO RELATED APPLICATIONS

This application claims the benefit of priority to Japanese Patent Application No. 2020-023373 filed on Feb. 14, 2020. The entire contents of this application are hereby incorporated herein by reference.

BACKGROUND OF THE INVENTION

1. Field of the Invention

The present invention relates to an attachment that holds a denture abutment, a cutting machine including the attachment, and a production method for a denture abutment.

2. Description of the Related Art

Conventionally, a denture including an implant (fixture) fixed to an alveolar bone and a crown (artificial crown) has been known. An abutment is disposed between the implant and the crown and connects the implant and the crown. For example, Japanese Laid-open Patent Publication No. 2019-188197 discloses an abutment including a shaft portion that is inserted in an implant and a body portion that is inserted in a crown. The abutment described in Japanese Laid-open Patent Publication No. 2019-188197 is made of ceramics, such as zirconia or the like, or a titanium alloy. Japanese Laid-open Patent Publication No. 2019-188197 discloses a method in which an abutment is produced by sintering zirconia powder and a method in which an abutment is produced by cutting a titanium alloy material.

There are premade, readymade abutments. However, it is also common to produce an abutment by cutting a material, which is called a pre-milled block before cutting, into a desired shape. FIG. 1 is a view illustrating a denture 1 used as an implant. FIG. 2 and FIG. 3 are perspective views of pre-milled blocks. FIG. 2 is a perspective view of a first type of pre-milled block 300. FIG. 3 is a perspective view of a second type of pre-milled block 400. However, the shapes of the pre-milled blocks illustrated in FIG. 2 and FIG. 3 are merely examples, and the pre-milled blocks may be formed in various shapes. As illustrated in FIG. 2, for example, the first type of pre-milled block 300 includes a cut portion 320 and a shaft portion 330. The cut portion 320 is cut into a body portion 4a of an abutment 4 illustrated in FIG. 1. The body portion 4a of the abutment 4 is inserted into a crown 2. In general, the shaft portion 330 is not cut and is kept as it is to define and function as a shaft portion 4b of the abutment 4. The shaft portion 330 is formed, for example, in a hexagonal columnar shape or an octagonal columnar shape. The shaft portion 330 has a direction around an axis line. The shaft portion 4b of the abutment 4 is inserted in an implant 3. The second type of pre-milled block 400 includes similar features and structures.

As illustrated in FIG. 2, the first type of pre-milled block 300 includes a held portion 310 in an end portion thereof in a side opposite to an end portion in which the shaft portion 330 is formed. In many cases, the held portion 310 is held by a cutting machine during cutting of the pre-milled block 300. As for the second type of pre-milled block 400, no step or the like is formed between a cut portion 420 and a held portion 410, and the cut portion 420 and the held portion 410 are continuously formed. The held portion 410 is held by the cutting machine during cutting of the second type of pre-milled block 400.

As illustrated in FIG. 2 and FIG. 3, each of the held portions 310 and 410 preferably have an approximately round columnar shape. However, a portion indicating a reference for a rotation position preferably has the held portions 310 and 410. In the first type of pre-milled block 300, a D cut surface 312 is formed as a rotation position reference in an outer peripheral surface 311 of the held portion 310. In the second type of pre-milled block 400, a recessed portion 412 is formed as a rotation position reference in an outer peripheral surface 411 of the held portion 410. Each of reference portions (the D cut surface 312 and the recessed portion 412) for the respective rotation positions of the pre-milled blocks 300 and 400 is recessed from a corresponding one of the approximately round columnar outer peripheral surfaces 311 and 411 of the held portions 310 and 410. Each of the pre-milled blocks 300 and 400 has a direction around an axis line.

SUMMARY OF THE INVENTION

Preferred embodiments of the present invention provide holding attachments for denture abutments that are each able to easily determine directions of materials of the denture abutments before cutting relative to a corresponding cutting machine. Preferred embodiments of the present invention also provide cutting machines including the holding attachments and production methods for denture abutments using the holding attachments.

According to a preferred embodiment of the present invention, a holding attachment for a denture abutment is an attachment which holds a material of the denture abutment before cutting. The material includes a round or substantially round columnar held portion in which a position reference portion is provided in one rotation position and a cut portion with a round or substantially round columnar shape coaxial or substantially coaxial with the held portion. The holding attachment includes a holding portion with a round or substantially round columnar hole shape in which the held portion of the material before cutting is inserted and a mounting portion that is mounted on a work mount of a cutting machine. The mounting portion includes at least one pin that is inserted in at least one pin insertion hole provided in the work mount of the cutting machine, and at least one engagement portion that is engaged with at least one rotation stopper provided in the work mount of the cutting machine. The position reference portion of the material before cutting is recessed from a round or substantially round columnar outer peripheral surface of the held portion. The held portion includes a fitting portion fit to the position reference portion of the material before cutting.

According to the above described holding attachment, the pin and the engagement portion of the holding attachment correspond to the pin insertion hole and the rotation stopper of the cutting machine, respectively, and therefore, a direction of the holding attachment relative to the cutting machine is able to be easily determined. Moreover, the fitting portion of the holding attachment is fitted to the position reference portion of the material before cutting, and therefore, a direction of the material before cutting relative to the holding attachment is able to be easily determined. Therefore, according to the above described holding attachment, the direction of the material of a denture abutment before cutting relative to the cutting machine is able to be easily determined.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
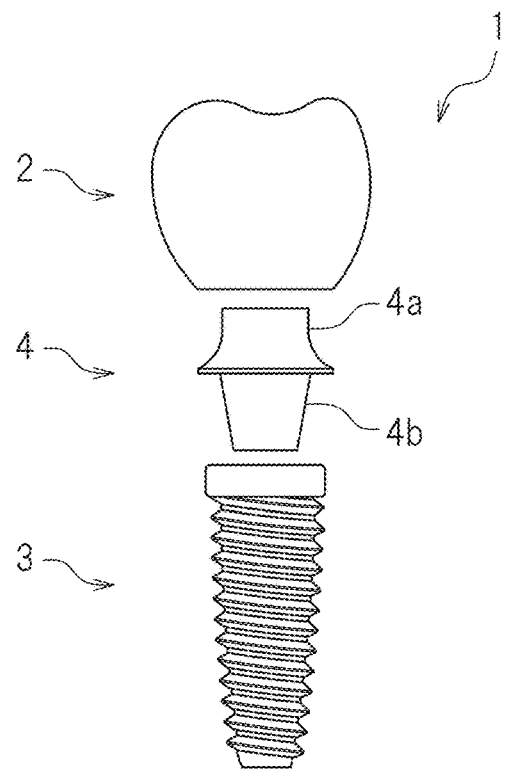
FIG. 1 is a view illustrating a denture used as an implant.

With reference to the attached drawings, holding attachments (which will be hereinafter referred to as attachments) for denture abutments according to some preferred embodiments and cutting machines according to some preferred embodiments will be described below. The preferred embodiments described herein are not intended to be particularly limiting the present invention. Features, elements, and parts that have the same or similar function are denoted by the same reference character and redundant description will be omitted or simplified, as appropriate.

Figure 4:
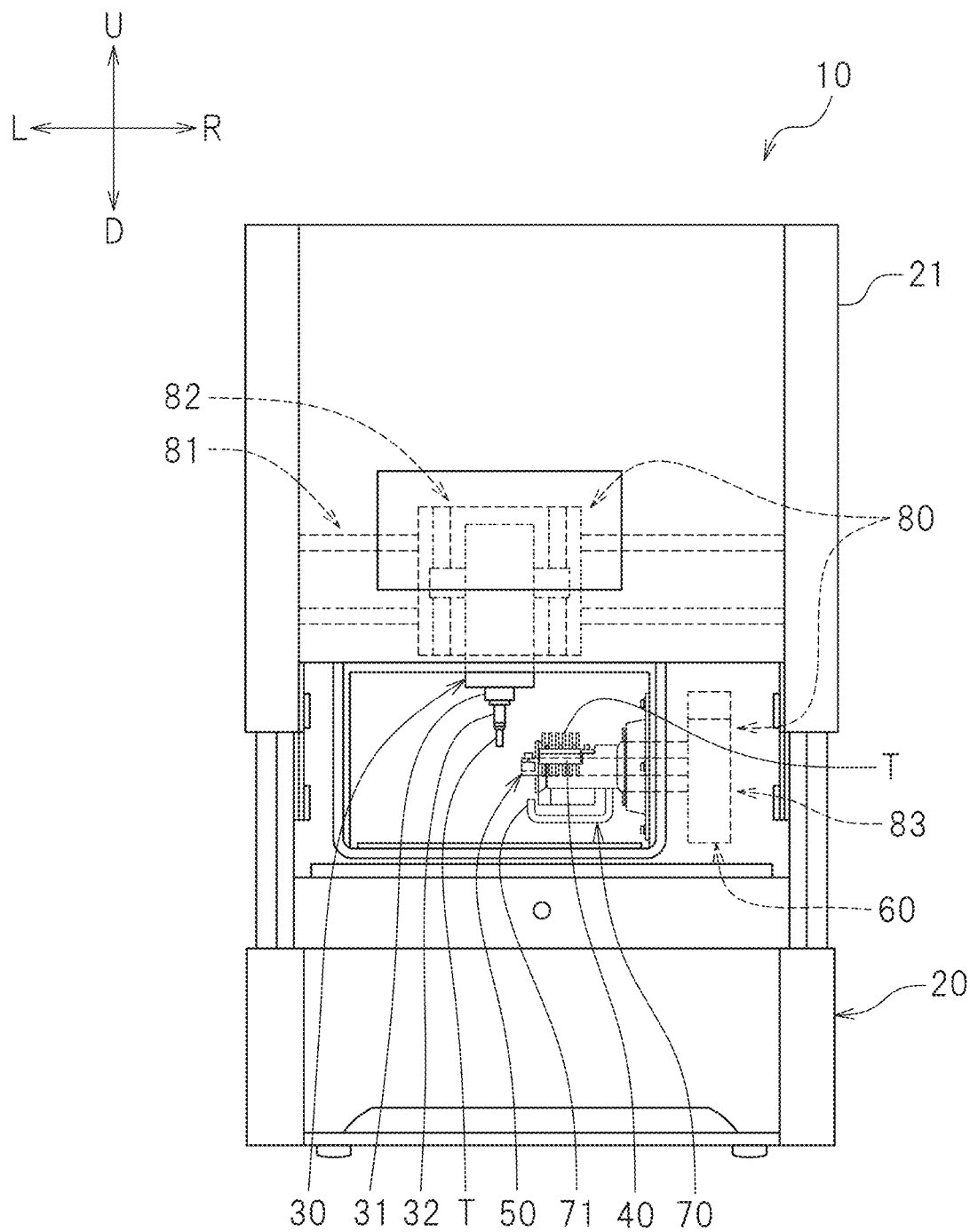
FIG. 4 is a front view of a cutting machine according to a preferred embodiment of the present invention.

First, a cutting machine according to a preferred embodiment will be described. FIG. 4 is a front view of a cutting machine 10 according to the present preferred embodiment. In the following description, when the cutting machine 10 is viewed from front, a direction away from the cutting machine 10 is a forward direction and a direction approaching the cutting machine 10 is a rear direction. Left, right, up, and down mean left, right, up, and down when the cutting machine 10 is viewed from front, respectively. Reference symbols F, Rr, L, R, U, and D in the drawings are front, rear, left, right, up, and down, respectively.

As illustrated in FIG. 4, the cutting machine 10 preferably has a box shape or substantially box shape. The cutting machine 10 includes a case 20 and a front cover 21. The front cover 21 is provided in a front end of the case 20 and is movable in an up-down direction. When the front cover 21 moves upward and opens, an internal space of the case 20 communicates with an outside space. When the front cover 21 moves downward and closes, the internal space of the case 20 is separated from the outside space. In FIG. 4, a state in which the front cover 21 has moved upward and the internal space communicates with the outside space is illustrated.

As illustrated in FIG. 4, the cutting machine 10 includes a main shaft 30, a tool magazine 40, a work mounting mechanism 50, a rotation device 60, a coolant supply device 70, and a moving device 80.

The main shaft 30 holds and rotates a cutting tool T. The cutting tool T gripped by the main shaft 30 rotates around an axis line extending in the up-down direction. As the cutting tool T, any one of cutting tools of a plurality of types with different blade shapes and different thicknesses may be implemented. The cutting tool T is, for example, an end mill. As illustrated in FIG. 4, the main shaft 30 includes a spindle 31 and a tool gripper 32.

The spindle 31 extends in the up-down direction. The spindle 31 rotates around the axis line extending in the up-down direction. The spindle 31 is rotated by a driver (not illustrated). The tool gripper 32 is provided at a lower end of the spindle 31. The tool gripper 32 grips the cutting tool T. The tool gripper 32 rotates with the spindle 31. Accordingly, the cutting tool T gripped by the tool gripper 32 rotates. Herein, the tool gripper 32 includes a collet chuck (not illustrated).

Figure 5:
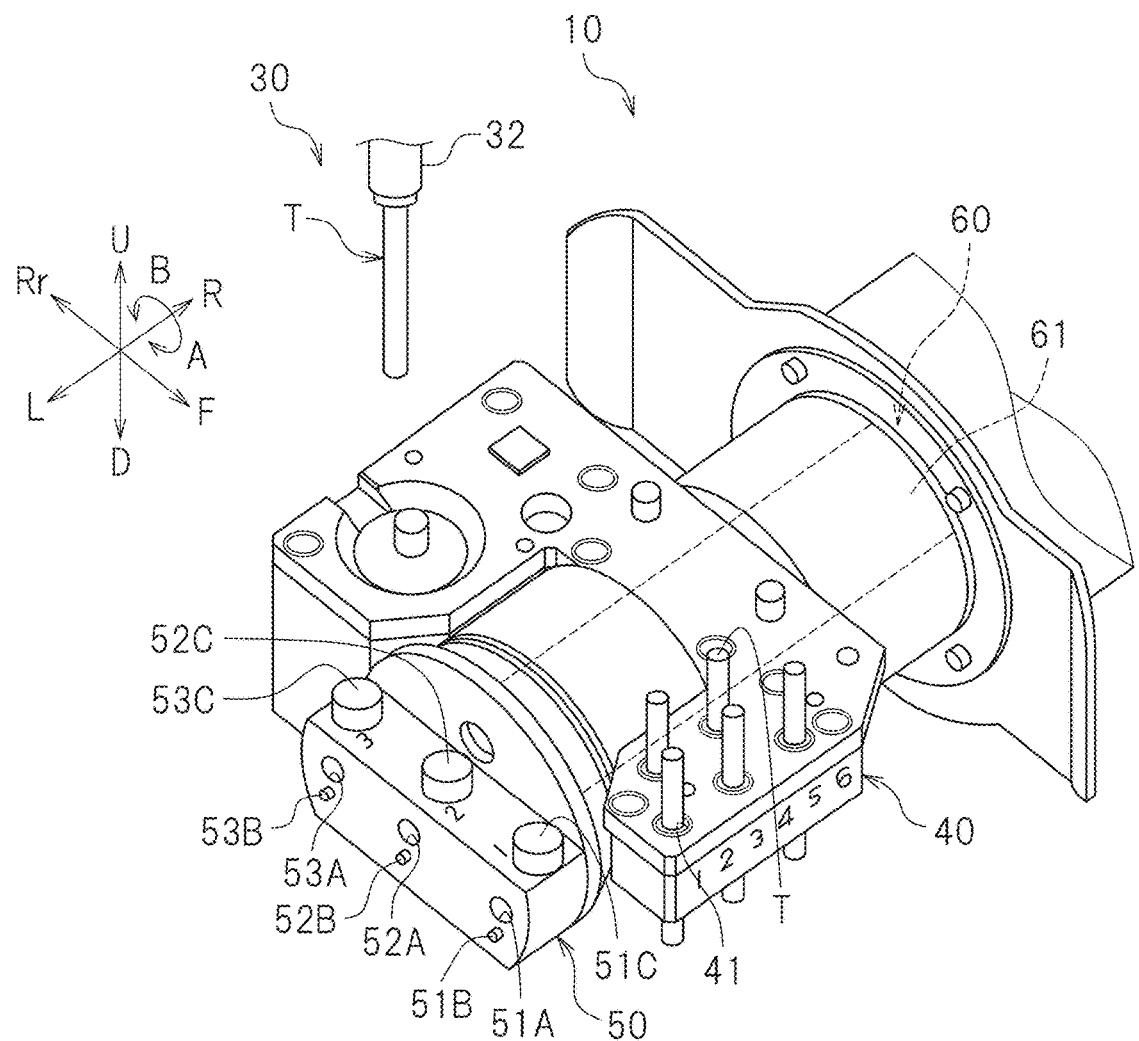
FIG. 5 is a perspective view illustrating a work holding mechanism.

The tool magazine 40, the work mounting mechanism 50, the rotation device 60, and the coolant supply device 70 are integral with one another. FIG. 5 is a perspective view illustrating around the work mounting mechanism 50. As illustrated in FIG. 5, the tool magazine 40 stores a plurality of cutting tools T. The tool magazine 40 includes a plurality of stockers 41. The plurality of stockers 41 are round or substantially round columnar holes each storing one cutting tool T.

A workpiece to be cut is mounted on the work mounting mechanism 50. In a case of processing a denture abutment, an attachment to hold an abutment is mounted on the work mounting mechanism 50. As illustrated in FIG. 5, the work mounting mechanism 50 includes a first insertion hole 51A, a second insertion hole 52A, and a third insertion hole 53A. Each of the first insertion hole 51A, the second insertion hole 52A, and the third insertion hole 53A extends rightward from a left end of the work mounting mechanism 50. Each of the first insertion hole 51A, the second insertion hole 52A, and the third insertion hole 53A is a hole having a circular or substantially circular cross section. The first insertion hole 51A, the second insertion hole 52A, and the third insertion hole 53A are provided in a line.

As illustrated in FIG. 5, each of a first rotation stopper 51B, a second rotation stopper 52B, and a third rotation stopper 53B is provided outside a corresponding one of the first insertion hole 51A, the second insertion hole 52A, and the third insertion hole 53A in a circumferential direction thereof. Each of the first rotation stopper 51B, the second rotation stopper 52B, and the third rotation stopper 53B protrudes leftward from the left end of the work mounting mechanism 50. Each of the first rotation stopper 51B, the second rotation stopper 52B, and the third rotation stopper 53B preferably has a round or substantially round columnar shape.

The work mounting mechanism 50 includes a first fixing screw 51C, a second fixing screw 52C, and a third fixing screw 53C. Each of the first fixing screw 51C, the second fixing screw 52C, and the third fixing screw 53C is meshed with a screw hole (not illustrated) passing through a side surface of a corresponding one of the first insertion hole 51A, the second insertion hole 52A, and the third insertion hole 53A. The first fixing screw 51C, the second fixing screw 52C, and the third fixing screw 53C are meshed with the respective screw holes (not illustrated) to press the workpiece or the attachment inserted in the first insertion hole 51A, the second insertion hole 52A, and the third insertion hole 53A.

The rotation device 60 rotates the work mounting mechanism 50 around a rotary axis 61 (in an A direction and a B direction in FIG. 5) which extends in a direction perpendicular or substantially perpendicular to the axis line direction of the main shaft 30 (the up-down direction herein). The rotary axis 61 is rotated by the driver (not illustrated). The driver includes, for example, a servo motor. The work mounting mechanism 50 rotates in the A direction and the B direction by the rotation device 60 and is positioned at a predetermined angle.

The coolant supply device 70 (see FIG. 4, not illustrated in FIG. 5) discharges a coolant toward a position that is located farther leftward of the left end of the work mounting mechanism 50 and in which the workpiece is mounted. As illustrated in FIG. 4, the coolant supply device 70 includes a coolant nozzle 71 that is opened toward an attachment position of the workpiece. The coolant is jetted to the workpiece during cutting thereof, and thus, the workpiece heated by cutting heat is cooled down.

The moving device 80 moves the main shaft 30 in a left-right direction and the up-down direction and move the tool magazine 40, the work mounting mechanism 50, the rotation device 60, and the coolant supply device 70 in a front-rear direction. As illustrated in FIG. 4, the moving device 80 includes a first moving mechanism 81, a second moving mechanism 82, and a third moving mechanism 83. The first moving mechanism 81 moves the main shaft 30 in the left-right direction. The second moving mechanism 82 moves the main shaft 30 in the up-down direction. The third moving mechanism 83 moves the tool magazine 40, the work mounting mechanism 50, the rotation device 60, and the coolant supply device 70 in the front-rear direction.

In this preferred embodiment, the moving device 80 moves the main shaft 30 in the left-right direction and the up-down direction and moves the tool magazine 40, the work mounting mechanism 50, the rotation device 60, and the coolant supply device 70 in the front-rear direction, but the moving device 80 is not limited to providing these specific movements. For example, the moving device 80 may only move at least one of the main shaft 30 and the rotation device 60 (including the work mounting mechanism 50 held by the rotation device 60) to change a positional relationship of the main shaft 30 and the rotation device 60, and there is no further limitation on the operation of the moving device 80. For example, the moving device 80 may move the main shaft 30 in the left-right direction, the front-rear direction, and the up-down direction.

The cutting machine 10 according to one preferred embodiment has been described above. The cutting machine 10 described above is, however, merely an example. There is no particular limitation on the features and structures of cutting machines according to preferred embodiments of the present invention.

Next, a pre-milled block of a denture abutment will be described. The pre-milled block is an example of a material of the denture abutment before cutting. The first type of pre-milled block 300 and the second type of pre-milled block 400 will be described below.

Figure 2:
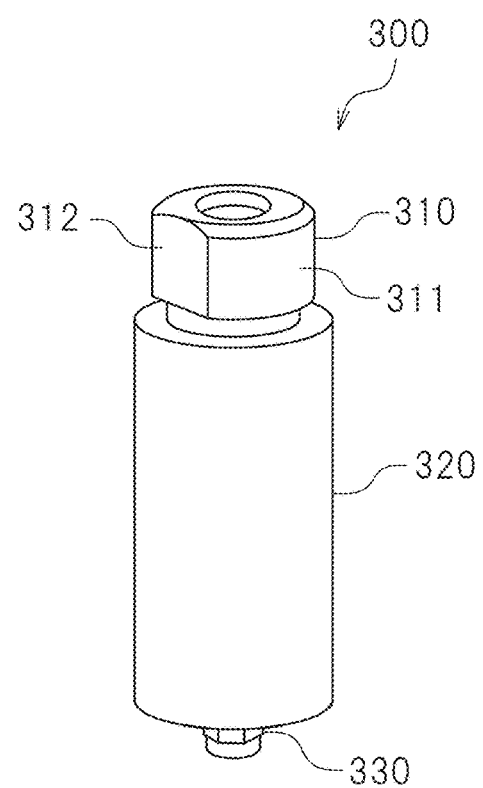
FIG. 2 is a perspective view of a first type of pre-milled block.

As illustrated in FIG. 2, the first type of pre-milled block 300 includes the round or substantially round columnar held portion 310, the cut portion 320 formed in a round columnar shape coaxial or substantially coaxial with the held portion 310, and the shaft portion 330. Herein, the pre-milled block 300 includes a titanium alloy. However, a material of the pre-milled block 300 may be, for example, a cobalt chromium alloy or the like. There is no particular limitation on the material of the pre-milled block 300. The held portion 310 is located at one end portion of the pre-milled block 300. A position reference portion defining a rotation position reference around an axis line is provided at one rotation position of the round or substantially round columnar held portion 310. In the first type of pre-milled block 300, the position reference portion is the D cut surface 312 provided by removing a portion of the round or substantially round columnar outer peripheral surface 311 of the held portion 310 in a planar shape.

The cut portion 320 preferably has a round or substantially round columnar shape. A portion that defines and functions as a rotation position reference is not provided at an outer peripheral surface of the cut portion 320. The cut portion 320 has a larger diameter than a diameter of the held portion 310.

The shaft portion 330 to be inserted in the implant 3 (see FIG. 1) is provided in an end portion of the first type of pre-milled block 300 in an opposite side to the held portion 310. Herein, the shaft portion 330 preferably has an octagonal or substantially octagonal columnar shape. As will be described below, in cutting the pre-milled block 300, the D cut surface 312 of the held portion 310 is used as a reference for a direction around the axis line. A relationship between a direction of the D cut surface 312 and a direction of the shaft portion 330 is determined in advance, and therefore, in the pre-milled block 300 after the cutting process is completed, the shaft portion 330 is directed in a predetermined direction relative to the other portions. A hole (not illustrated) with a cross-sectional shape corresponding to a cross-sectional shape of the shaft portion 330 is provided in the implant 3 corresponding to the first type of pre-milled block 300. The shaft portion 330 is inserted in the hole of the implant 3, and thus, respective directions of the implant 3 and the abutment 4 (see FIG. 1) around the axis line are able to be matched to each other.

Figure 3:
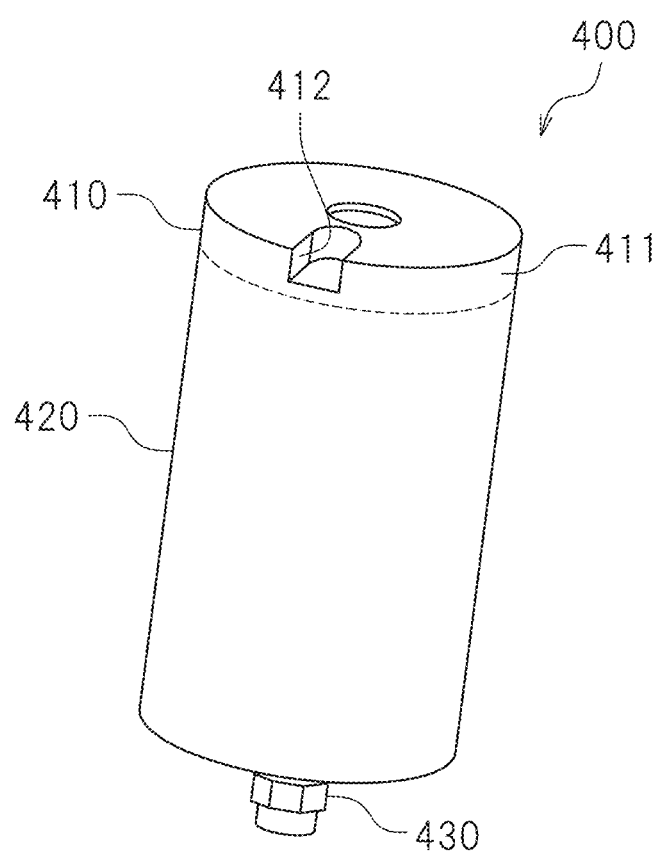
FIG. 3 is a perspective view of a second type of pre-milled block.

As illustrated in FIG. 3, the second type of pre-milled block 400 also includes a round or substantially round columnar held portion 410 and the cut portion 420 provided in the round or substantially round columnar shape coaxial or substantially coaxial with the held portion 410. However, in the second type of pre-milled block 400, the held portion 410 has the same or substantially the same diameter as a diameter of the cut portion 420. There is no structure, for example, a step or the like, defining a boundary between the held portion 410 and the cut portion 420. The held portion 410 and the cut portion 420 are continuously formed. Herein, the pre-milled block 400 also includes a titanium alloy. However, there is also no limitation on a material of the pre-milled block 400.

The held portion 410 is provided in one end portion of the pre-milled block 400. A recessed portion 412 is provided as a position reference portion defining a rotation position reference around the axis line in one rotation position of the round or substantially round columnar held portion 410. The recessed portion 412 is provided at a portion of the substantially round columnar outer peripheral surface 411 of the held portion 410. The recessed portion 412 is recessed more inward than the outer peripheral surface 411 in a radial direction of the held portion 410. The recessed portion 412 extends from the outer peripheral surface 411 toward a central axis of the pre-milled block 400. The recessed portion 412 is exposed in the one portion of the pre-milled block 400. Herein, the recessed portion 412 is a groove in the one end portion of the pre-milled block 400 and extending in a normal direction or substantially in the normal direction of the circumference of the one end portion.

The cut portion 420 preferably has a round or substantially round columnar shape. Similar to the first type of pre-milled block 300, a portion that defines and functions as a rotation position reference is not provided at an outer peripheral surface of the cut portion 420. There is no particular need to determine a boundary between the held portion 410 and the cut portion 420 but, for convenience, the held portion 410 is a portion that is inserted in a holding attachment 200 (see FIG. 10) for the pre-milled block 400. The held portion 410 includes at least the recessed portion 412. In a pre-milled block including a recessed portion, a clear boundary, that is, for example, a step, may be provided between a held portion and a cut portion.

A shaft portion 430 is provided in an end portion of the pre-milled block 400 in an opposite side to the held portion 410. Herein, the shaft portion 430 preferably has an octagonal or a substantially octagonal columnar shape. As will be described below, during cutting of the pre-milled block 400, the recessed portion 412 of the held portion 410 is used as a reference for a direction around an axis line. A relationship between a direction of the recessed portion 412 and a direction of the shaft portion 430 is determined in advance, and therefore, in the pre-milled block 400 after cutting process is completed, the shaft portion 430 is directed in a predetermined direction relative to the other portions. A hole (not illustrated) with a cross-sectional shape corresponding to a cross-sectional shape of the shaft portion 430 is provided in the implant 3 corresponding to the second type of pre-milled block 400. The shaft portion 430 is inserted in the hole of the implant 3, and thus, respective directions of the implant 3 and the abutment 4 around the axis line are able to be matched to each other.

Each of the D cut surface 312 as the position reference portion of the first type of pre-milled block 300 and the recessed portion 412 as the position reference portion of the second type of pre-milled block 400 is recessed from a corresponding one of the round or substantially round columnar outer peripheral surfaces 311 and 411 of the held portions 310 and 410.

Figure 6:
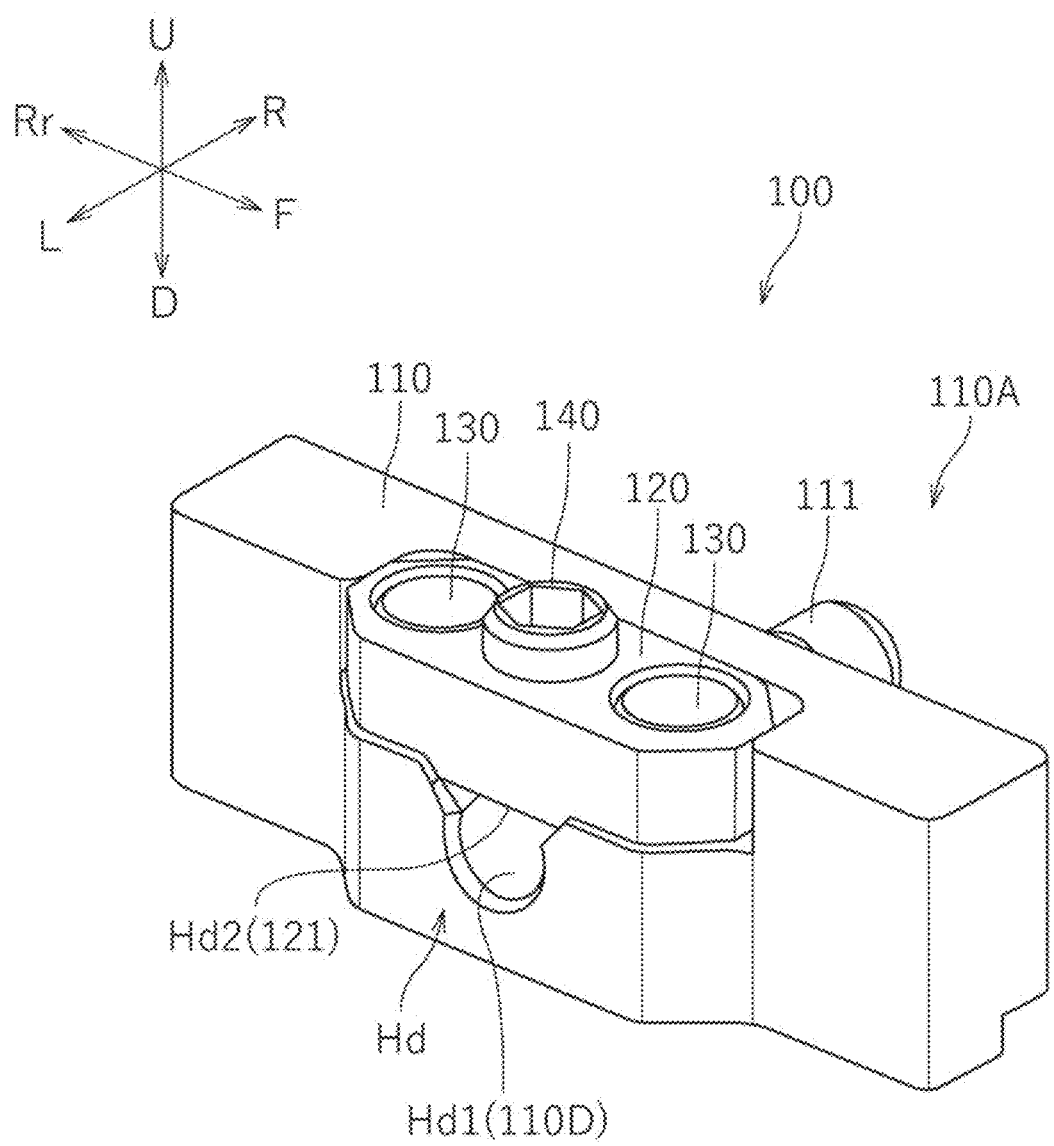
FIG. 6 is a perspective view of an attachment according to a first preferred embodiment of the present invention when viewed from a left front side.
Figure 7:
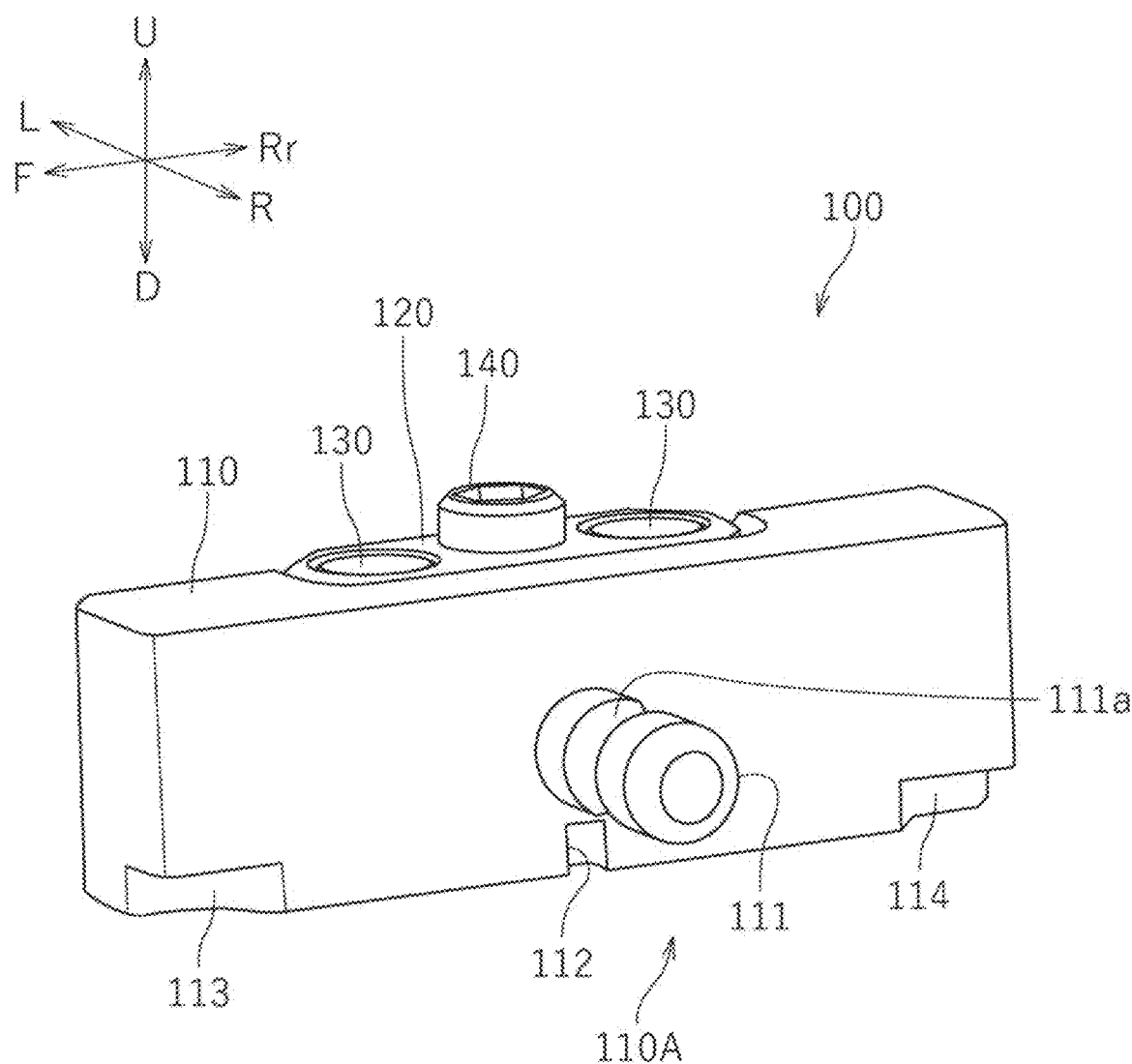
FIG. 7 is a perspective view of the attachment according to the first preferred embodiment of the present invention when viewed from a right front side.
Figure 10:
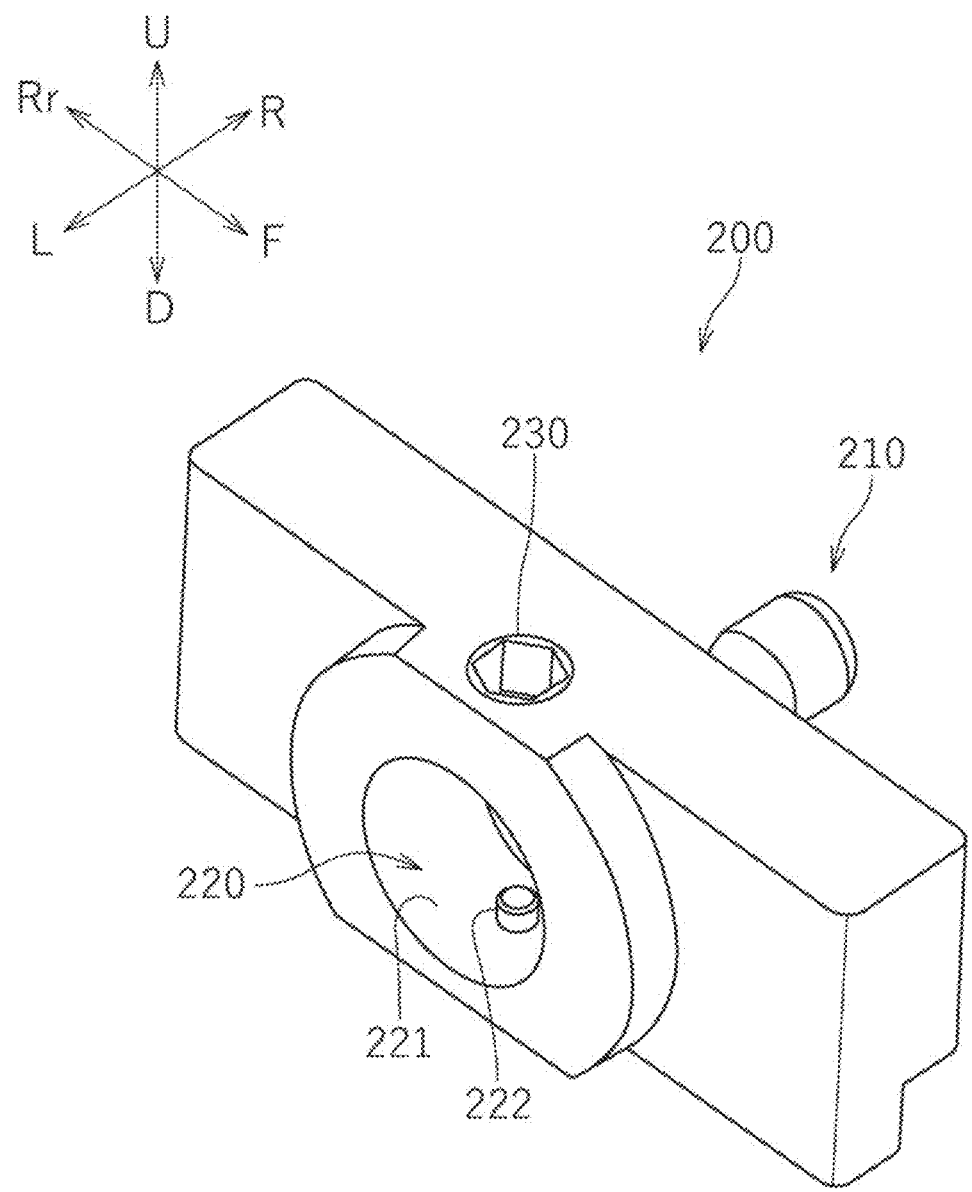
FIG. 10 is a perspective view of an attachment according to a second preferred embodiment of the present invention when viewed from a left front side.

A holding attachment for a denture abutment (which will be hereinafter merely referred to as an attachment) according to a first preferred embodiment corresponds to the first type of pre-milled block 300. FIG. 6 is a perspective view of an attachment 100 according to the first preferred embodiment when viewed from a left front side. FIG. 7 is a perspective view of the attachment 100 according to the first preferred embodiment when viewed from a right front side. Front, rear, left, right, up, and down in FIG. 6 and FIG. 7 correspond to front, rear, left, right, up, and down in FIG. 5, respectively. FIG. 6 and FIG. 10 illustrate the attachments 100 and 200 provided in a direction in which the attachments 100 and 200 are attached to the cutting machine 10.

Figure 8:
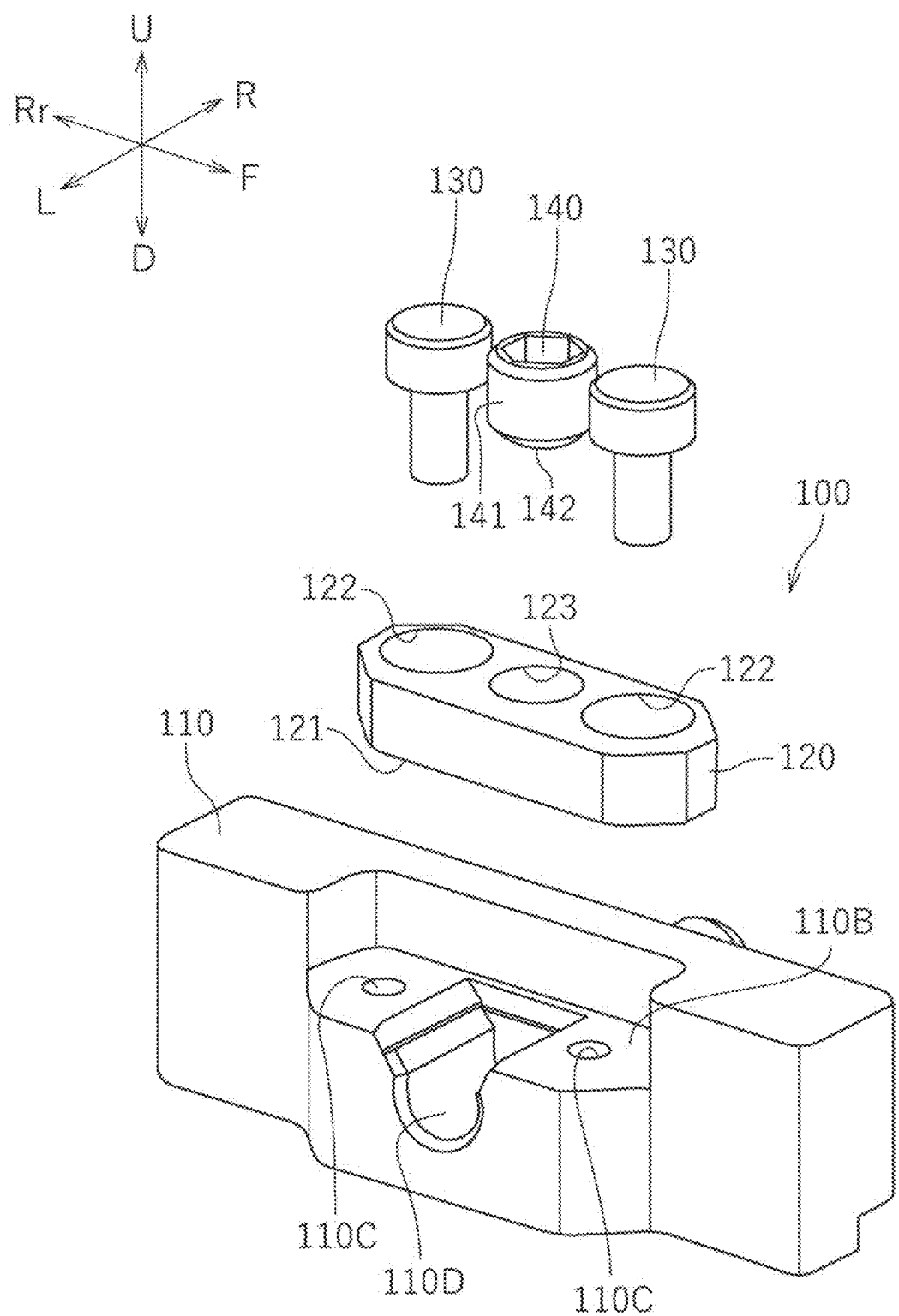
FIG. 8 is a perspective view illustrating a state in which a main body and a positioning structure are separated from each other.

As illustrated in FIG. 6, the attachment 100 according to this preferred embodiment includes a main body 110 and a positioning structure 120. FIG. 8 is a perspective view illustrating a state in which the main body 110 and the positioning structure 120 are separated from each other. As illustrated in FIG. 8, the main body 110 and the positioning structure 120 are joined together by fastening two fixing screws 130. The main body 110 and the positioning structure 120 are able to be separated from each other by removing the two fixing screws 130. The positioning structure 120 is attachable to and detachable from the main body 110. The main body 110 and the positioning structure 120 include, for example, stainless steel. However, there is no particular limitation on a material of the attachment 100.

As illustrated in FIG. 7, a mounting portion 110A is provided in a right end of the main body 110, that is, an end portion of the main body 110 in a side facing to the work mounting mechanism 50 of the cutting machine 10. The mounting portion 110A is mountable on the work mounting mechanism 50 of the cutting machine 10. As illustrated in FIG. 7, the mounting portion 110A includes a universal pin 111, an engaging groove 112, a first relief portion 113, and a second relief portion 114. The universal pin 111 is a pin that is inserted in the second insertion hole 52A provided in the work mounting mechanism 50. The universal pin 111 extends in the left-right direction. The universal pin 111 is provided in a central portion in a right end surface of the main body 110. As illustrated in FIG. 7, a circumferential groove 111a is provided in the middle of the universal pin 111 in a direction in which the universal pin 111 extends. The circumferential groove 111a extends over an entire circumference in a portion of an outer peripheral surface of the universal pin 111. When the universal pin 111 is inserted in the second insertion hole 52A of the work mounting mechanism 50 and the second fixing screw 52C is fastened, a tip of the second fixing screw 52C is fitted in the circumferential groove 111a. Thus, the main body 110 is fixed to the work mounting mechanism 50.

The engaging groove 112 is an example of an engagement portion that is engaged with a rotation stopper provided in the work mounting mechanism 50 of the cutting machine 10. As illustrated in FIG. 7, the engaging groove 112 is aligned with the universal pin 111 in a short-length direction of the main body 110. The engaging groove 112 is recessed from the right end surface of the main body 110. When the main body 110 is rotated around an axis line of the universal pin 111 while the universal pin 111 is inserted in the second insertion hole 52A of the work mounting mechanism 50, the engaging groove 112 and the second rotation stopper 52B are fitted together in one rotation position. The universal pin 111 is able to be completely inserted in the second insertion hole 52A only in this rotation position. Thus, a direction of the main body 110 relative to the work mounting mechanism 50 is determined. Each of the first relief portion 113 and the second relief portion 114 is a recessed portion that prevents interference between a corresponding one of the first rotation stopper 51B and the second rotation stopper 52B and the main body 110.

The mounting portion may include at least one pin that is inserted in at least one pin insertion hole provided in the work mounting mechanism of the cutting machine and at least one engagement portion that is engaged with at least one rotation stopper provided in the work mounting mechanism. The features and structure of the mounting portion are not limited to the features and structure described above. The cutting machine 10 described as an example herein includes the first insertion hole 51A, the second insertion hole 52A, and the third insertion hole 53A as pin insertion holes. The mounting portion may include one or more pins that are to be inserted to one or more of the first insertion hole 51A, the second insertion hole 52A, and the third insertion hole 53A. The cutting machine 10 described as an example herein includes the first rotation stopper 51B, the second rotation stopper 52B, and the third rotation stopper 53B as original rotation stoppers. The first insertion hole 51A, the second insertion hole 52A, and the third insertion hole 53A are also able to function as or define rotation stoppers. The rotation stoppers of the work mounting mechanism may be not be projecting portions but may be recessed portions. Therefore, for example, one pin of the mounting portion is able to be inserted in one of the first insertion hole 51A, the second insertion hole 52A, and the third insertion hole 53A and one or two projections to stop rotation may be inserted one or two of the other ones of the first insertion hole 51A, the second insertion hole 52A, and the third insertion hole 53A. There is no particular limitation on the features and structure of the work mounting mechanism and the features and structure of the mounting portion.

As illustrated in FIG. 8, in the main body 110, a step portion 110B that straddles a left surface and an upper surface of the main body 110 is provided. The step portion 110B is recessed from the upper surface of the main body 110. The step portion 110B extends rightward from a left end of the main body 110. Herein, the step portion 110B is a portion cut out in the left end of the main body 110. However, the step portion 110B may be located, for example, inward of the upper surface of the main body 110. The positioning structure 120 is mounted on the step portion 110B. Two screw holes 110C with which the two fixing screws 130 that fasten the main body 110 and the positioning structure 120 together are meshed are opened in the upper surface of the step portion 110B.

A circular or substantially circular groove 110D is provided in the step portion 110B. The circular or substantially circular groove 110D has a cross-sectional shape corresponding to an arc portion (a portion other than the D cut surface 312 of the held portion 310) of the held portion 310 of the pre-milled block 300. The circular or substantially circular groove may have a portion corresponding to a portion of the arc portion of the held portion 310 and a portion that has escaped more outside than the portion in the radial direction. The circular or substantially circular groove 110D extends in the left-right direction. In a state where the main body 110 is mounted on the cutting machine 10, a central axis of the circular or substantially circular groove 110D matches the rotary axis 61 of the rotation device 60. Therefore, when the rotation device 60 is rotated, the circular or substantially circular groove 110D rotates around the central axis of itself without eccentricity.

The positioning structure 120 preferably has a flat or substantially flat plate shape. A surface of the positioning structure 120 that is placed on the step portion 110B defines a flat or substantially flat surface 121 corresponding to the D cut surface 312 of the held portion 310 of the pre-milled block 300. The positioning structure 120 includes two screw seat portions 122 with which the two fixing screws 130 are engaged and a screw hole 123 with which a flat head screw 140 is meshed. The screw hole 123 passes through the positioning structure 120. One end of the screw hole 123 is opened in the flat surface 121 and the other end thereof is opened in a reverse side of the flat surface 121.

As illustrated in FIG. 6, when the positioning structure 120 is mounted on the main body 110, a round or substantially round columnar holding portion Hd including a D cut surface Hd2 is defined by the circular or substantially circular groove 110D and the flat surface 121. The holding portion Hd is a round or substantially round columnar hole in which the held portion 310 of the pre-milled block 300 is inserted. The holding portion Hd includes an arc portion Hd1 and the D cut surface Hd2. The arc portion Hd1 is defined by the circular or substantially circular groove 110D in the main body 110. The D cut surface Hd2 is a fitting portion that is fitted to the D cut surface 312 of the pre-milled block 300. The D cut surface Hd2 is a surface provided by removing a portion of a round or substantially round columnar hole of the holding portion Hd in a planar or substantially planar shape, and the D cut surface Hd2 corresponds to the D cut surface 312. The D cut surface Hd2 is defined by the flat or substantially flat surface 121 provided in the positioning structure 120.

Figure 9:
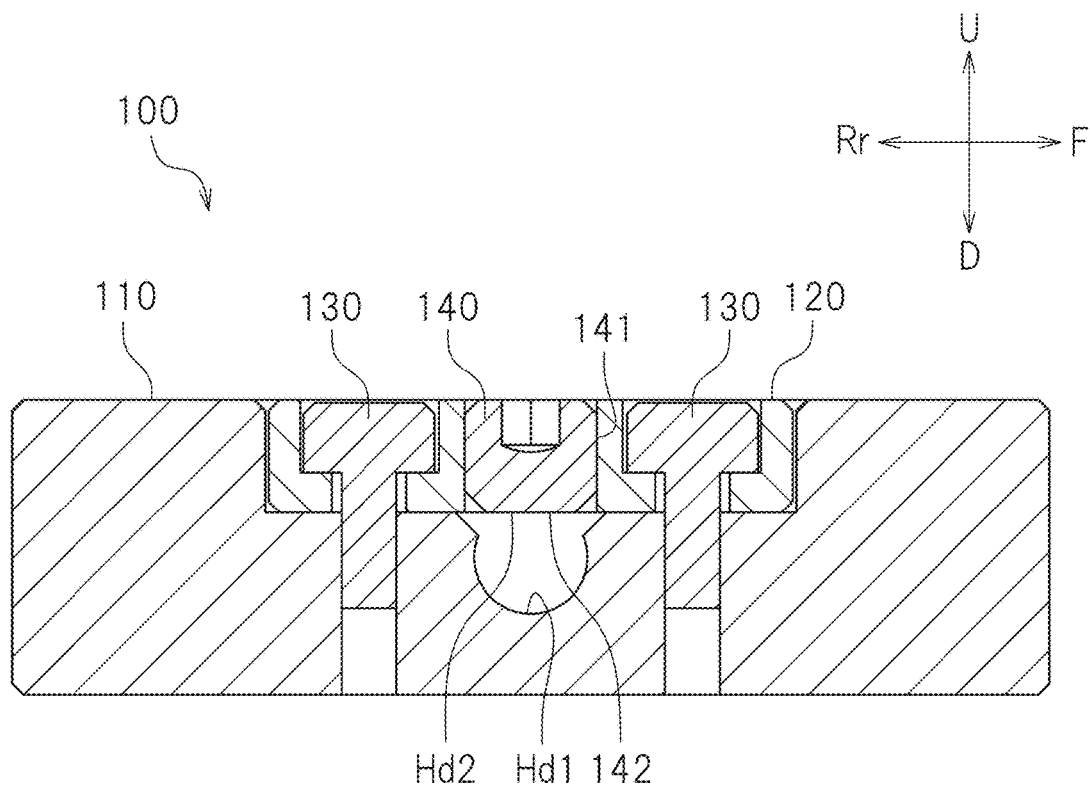
FIG. 9 is a longitudinal-sectional view of the attachment.

The flat head screw 140 is an example of a pressing structure that presses the held portion 310 of the pre-milled block 300 in a direction perpendicular or substantially perpendicular to the D cut surface Hd2 to push the held portion 310 against the holding portion Hd. FIG. 9 is a longitudinal-sectional view of the attachment 100. As illustrated in FIG. 9, herein, the flat head screw 140 is able to press the D cut surface 312 (see FIG. 2) of the held portion 310 in a direction perpendicular or substantially perpendicular to the D cut surface 312. However, the pressing structure may, for example, press the arc portion of the held portion 310 in a direction perpendicular or substantially perpendicular to the D cut surface 312 to push the D cut surface 312 of the held portion 310 against the D cut surface Hd2 of the holding portion Hd. The flat head screw 140 includes a screw portion 141 in which a screw thread is provided an outer surface and a flat tip portion 142 that abuts on the D cut surface 312 of the pre-milled block 300 when the screw portion 141 is meshed with the screw hole 123 of the positioning structure 120. When the flat head screw 140 is fastened, the tip portion 142 presses the D cut surface 312 of the held portion 310.

In attaching the pre-milled block 300 to the work mounting mechanism 50 of the cutting machine 10, for example, the pre-milled block 300 is first mounted on the attachment 100. In attaching the pre-milled block 300 to the attachment 100, the held portion 310 of the pre-milled block 300 is inserted in the holding portion Hd of the attachment 100. The held portion 310 is not able to be inserted in the holding portion Hd in other positions than a rotation position in which the direction of the D cut surface 312 and the direction of the D cut surface Hd2 match each other. Therefore, a rotation position of the pre-milled block 300 relative to the attachment 100 is determined. At this time, the two fixing screws 130 may be slightly loosened to facilitate mounting of the pre-milled block 300 on the attachment 100. The two fixing screws 130 may be fastened again after the held portion 310 is inserted.

The cut portion 320 of the pre-milled block 300 has a larger diameter than the diameter of the held portion 310. Therefore, the pre-milled block 300 is inserted in the attachment 100 until the held portion 310 hits a left end surface of the attachment 100. Thereafter, the flat head screw 140 is fastened. Accordingly, the flat tip portion 142 of the flat head screw 140 presses the D cut surface 312 of the held portion 310. Thus, the pre-milled block 300 is fixed to the attachment 100. Even in a case where there is some slight play between the held portion 310 of the pre-milled block 300 and the holding portion Hd of the attachment 100, positioning of the rotation position of the pre-milled block 300 relative to the attachment 100 is precisely performed by pressing by the flat head screw 140.

Next, the attachment 100 with the pre-milled block 300 mounted thereon is mounted on the cutting machine 10. In this process, the universal pin 111 is inserted to the second insertion hole 52A of the work mounting mechanism 50 in the rotation position of the attachment 100 in which the engaging groove 112 and the second rotation stopper 52B are fitted together. The universal pin 111 is able to be completely inserted in the second insertion hole 52A only in this rotation position. Thus, the direction of the attachment 100 relative to the work mounting mechanism 50 is determined. The attachment 100 is inserted until a right end surface of the attachment 100 hits a left end surface of the work mounting mechanism 50. After the attachment 100 is inserted to the above described position, the second fixing screw 52C is fastened. Thus, the attachment 100 is fixed to the work mounting mechanism 50. In a state where the attachment 100 is mounted on the cutting machine 10, the axis line of the pre-milled block 300 and an axis line of the rotary axis 61 of the rotation device 60 match each other.

As described above, the attachment 100 according to this preferred embodiment includes the D cut surface Hd2 provided by removing a portion of the round columnar hole of the holding portion Hd in a planar shape, and the D cut surface Hd2 corresponds to the D cut surface 312 of the pre-milled block 300. Therefore, the rotation position of the pre-milled block 300 relative to the attachment 100 is able to be easily adjusted. The rotation position of the attachment 100 relative to the cutting machine 10 is able to be easily adjusted by the mounting portion 110A of the attachment 100. As a result, the rotation position of the pre-milled block 300 relative to the cutting machine 10 is able to be easily adjusted.

In this preferred embodiment, the arc portion Hd1 of the round columnar hole of the holding portion Hd is provided in the main body 110 of the attachment 100. The flat surface 121 defining the D cut surface Hd2 of the holding portion Hd is provided in the positioning structure 120 that is attachable to and detachable from the main body 110. The holding portion Hd is formed by mounting the positioning structure 120 on the main body 110. According to the features and structure described above, the arc portion Hd1 of the round columnar hole of the holding portion Hd and the D cut surface Hd2 is able to be easily produced. For example, in a case of forming a round or substantially round columnar hole including an arc portion and a D cut surface in an integrated attachment by cutting, for example, milling with a much thinner end mill than the arc portion or like processing may be needed. According to a method in which the arc portion Hd1 is provided in the main body 110 and the D cut surface Hd2 is provided in the positioning 120, a round or substantially round columnar hole including an arc portion and a D cut surface is able to be more easily produced.

The attachment 100 according to this preferred embodiment includes the flat head screw 140 defining a pressing structure that presses the held portion 310 of the pre-milled block 300 in a direction perpendicular or substantially perpendicular to the D cut surface 312 to push the held portion 310 against the holding portion Hd. According to the features and structure described above, the pre-milled block 300 is fixed to the attachment 100. Positioning of the rotation position of the pre-milled block 300 relative to the attachment 100 is precisely performed by pressing by the flat head screw 140.

More specifically, the flat head screw 140 includes the screw portion 141 in which a screw thread is provided on the outer surface. The attachment 100 includes the screw hole 123 that is meshed with the screw portion 141 of the flat head screw 140 and has one end opened in the D cut surface Hd2. According to the features and structure described above, the tip portion 142 of the flat head screw 140 abuts on the D cut surface 312 of the pre-milled block 300. The D cut surface 312 of the pre-milled block 300 is pressed, and thus, positioning of the rotation position of the pre-milled block 300 relative to the attachment 100 is more precisely performed.

Furthermore, the flat head screw 140 includes the flat tip portion 142 that abuts on the D cut surface 312 of the pre-milled block 300 when the screw portion 141 is meshed with the screw hole 123. The D cut surface 312 of the pre-milled block 300, the D cut surface 312 being a flat surface, is pressed in the normal direction or substantially in the normal direction by the flat tip portion 142 of the flat head screw 140. Thus, positioning of the rotation position of the pre-milled block 300 relative to the attachment 100 is easily performed even more precisely.

In the description above, a step of mounting the pre-milled block 300 to the attachment 100 is performed before a step of mounting the attachment 100 on the work mounting mechanism 50 of the cutting machine 10. However, the order of the steps may be reversed.

Titanium alloy, which is the material of the pre-milled block 300, is a material that may be relatively difficult to process. Specifically, titanium alloy has a small heat conductivity, and therefore, cutting heat tends to remain in a cutting tool and a workpiece. Therefore, a life of the cutting tool tends to be short.

In this preferred embodiment, the pre-milled block 300 is rotated similar to a lathe, and thus, cutting heat is less likely to remain in the cutting tool T and the pre-milled block 300. As has been already described, a production process of the denture abutment 4 according to this preferred embodiment includes a step of mounting the held portion 310 of the pre-milled block 300 on the holding portion Hd of the attachment 100 and a step of mounting the mounting portion 110A of the attachment 100 on the work mounting mechanism 50 of the cutting machine 10. Thereafter, in this preferred embodiment, the rotation device 60 of the cutting machine 10 is driven to rotate the attachment 100 mounted on the work mounting mechanism 50 and to rotate the pre-milled block 300. Also, the main shaft 30 is driven to rotate the cutting tool T. In this preferred embodiment, the cutting tool T in a rotating state is brought into contact with the pre-milled block 300 in a state where the attachment 100 and the pre-milled block 300 are rotating to cut the pre-milled block 300. At least while the pre-milled block 300 is cut, the coolant is jetted to the pre-milled block 300.

The pre-milled block 300 rotates, and thus, a portion that is being cut by the cutting tool T continuously changes in the circumferential direction. Therefore, a time in which a cut portion is cooled down is generated. The cutting tool T abuts on a cooled portion of the pre-milled block 300, and therefore, is less likely to have heat. Thus, the cutting heat escapes from the pre-milled block 300 and the cutting tool T. As a result, the life of the cutting tool T is prolonged.

The attachment 100 and the pre-milled block 300 may not be rotated at all times during cutting. When it is not needed to rotate the attachment 100 and the pre-milled block 300, the attachment 100 and the pre-milled block 300 may not be rotated.

An attachment for a denture abutment according to a second preferred embodiment of the present invention corresponds to the second type of pre-milled block 400. FIG. 10 is a perspective view of an attachment 200 according to the second preferred embodiment when viewed from a left front side. As illustrated in FIG. 10, a mounting portion 210 is provided in a right end portion of the attachment 200. The mounting portion 210 may have the same or similar features and structures as the mounting portion according to the first preferred embodiment, or may have different features and structures from the mounting portion in the first preferred embodiment. Herein, a description of the mounting portion 210 will be omitted.

As illustrated in FIG. 10, in the attachment 200 according to this preferred embodiment, a fitting portion that is fitted to the recessed portion 412 of the pre-milled block 400 is a projecting portion that projects and corresponds to the recessed portion 412. The projecting portion is herein a positioning pin 222 set to stand in a circular hole 221 of a holding portion 220. The positioning pin 222 may be, for example, press-fitted in a hole provided in the circular hole 221. However, the features and structure of the projecting portion are not limited thereto. A rotation position of the pre-milled block 400 relative to the attachment 200 is able to be adjusted by inserting the pre-milled block 400 to the attachment 200, and the recessed portion 412 of the pre-milled block 400 is fitted to the positioning pin 222.

As illustrated in FIG. 10, the attachment 200 according to this preferred embodiment includes a flat head screw 230 that faces the positioning pin 222 as the projecting portion and presses the held portion 410 of the pre-milled block 400 in a normal direction or substantially in the normal direction of a round or substantially round columnar hole of the holding portion 220. A screw hole with which the flat head screw 230 is meshed is provided in the attachment 200. The screw hole passes through from an outer surface of the attachment 200 to the holding portion 220. The flat head screw 230 is fastened, and thus, a tip portion of the flat head screw 230 pushes the pre-milled block 400 against the holding portion 220. Thus, the pre-milled block 400 is fixed to the attachment 200. Positioning of the rotation position of the pre-milled block 400 relative to the attachment 200 is precisely performed by pressing by the flat head screw 230.

The pressing structure that presses the held portion 410 of the pre-milled block 400 in the normal direction or substantially in the normal direction of the round columnar hole of the holding portion 220 is not limited to the flat head screw 230 having a flat tip. The pressing structure is also not limited to a structure including a screw. The pressing structure may press the held portion 410 of the pre-milled block 400, for example, by an elastic element, for example, a spring or the like.

The holding attachments for a denture abutment and the cutting machine according to some preferred embodiments have been described above. However, a holding attachment for a denture abutment and a cutting machine are not limited to those described above. A production method for a denture abutment is not limited to the above described method.

For example, in the above described preferred embodiments, the main body 110 and the positioning structure 120 are separated from each other. However, the main body 110 and the positioning structure 120 may be integral with one another. The attachment 200 according to the second preferred embodiment includes a structure with an integral element. However, the attachment 200 may include elements that are separated into a plurality of separate portions.

In the above described preferred embodiments, the pre-milled block 300 or 400 is cut while being rotated by the cutting machine 10. However, the pre-milled block 300 or 400 may be cut without rotating.

Furthermore, the above described preferred embodiments do not limit features and structures of a holding attachment for a denture abutment and a cutting machine unless specifically stated otherwise. The above described preferred embodiments do not limit a production method for a denture abutment unless specifically stated otherwise.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which are able to be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A holding attachment for a denture abutment which holds a material of the denture abutment before cutting, the material including a round or substantially round columnar held portion in which a position reference portion is provided in one rotation position and a cut portion with a round or substantially round columnar shape coaxial or substantially coaxial with the held portion, the holding attachment comprising:
    a holding portion with a round or substantially round columnar hole shape in which the held portion of the material before cutting is inserted; and
    a mounting portion that is mounted on a work mount of a cutting machine; wherein
    the mounting portion includes:
        at least one pin that is inserted in at least one pin insertion hole in the work mount of the cutting machine; and
        at least one engagement portion that is engaged with at least one rotation stopper provided in the work mount of the cutting machine;
    the position reference portion of the material before cutting is recessed from a round or substantially round columnar outer peripheral surface of the held portion;
    the held portion includes a fitting portion fit to the position reference portion of the material before cutting;
    the position reference portion of the material before cutting includes a first cut surface provided by removing a portion of the round or substantially round columnar outer peripheral surface of the held portion in a planar shape; and
    the fitting portion includes a second cut surface provided by removing a portion of a round or substantially round columnar hole of the holding portion in a planar shape; and
    the second cut surface corresponds to the first cut surface.

2. The holding attachment according to claim 1, further comprising:
    a main body in which a mounting portion is provided; and
    a positioning structure that is attachable to and detachable from the main body; wherein
    an arc portion of a round or substantially round columnar hole of the holding portion is provided in the main body;

a flat surface defining the second cut surface is provided in the positioning structure; and the holding portion is provided by mounting the positioning structure on the main body.

3. The holding attachment according to claim 1, further comprising a pressing structure to press the held portion of the material before cutting in a direction perpendicular or substantially perpendicular to the first cut surface to push the held portion against the holding portion.

4. The holding attachment according to claim 3, wherein the pressing structure includes a screw portion in which a screw thread is provided on an outer surface thereof; and the holding attachment further includes a screw hole that is meshed with the screw portion and has one end opened in the second cut surface.

5. The holding attachment according to claim 4, wherein the pressing structure includes a flat tip portion that abuts the first cut surface of the material before cutting when the screw portion is meshed with the screw hole.

6. A cutting machine comprising:
the holding attachment according to claim 1;
a main shaft to hold and rotate a cutting tool;
a work mount on which the mounting portion of the holding attachment is mounted;
a rotator to rotate the work mount around a rotation axis extending in a direction perpendicular or substantially perpendicular to an axis line direction of the main shaft; and
a mover to move at least one of the main shaft and the rotator to change a positional relationship between the main shaft and the rotator.

7. A production method for a denture abutment using the cutting machine according to claim 6, the production method comprising:
mounting the held portion of the material before cutting to the holding portion of the holding attachment;
mounting the mounting portion of the holding attachment to the work mount of the cutting machine;
driving the rotator to rotate the holding attachment mounted on the work mount and the material before cutting;
driving the main shaft to rotate the cutting tool; and
bringing the cutting tool in a rotating state into contact with the material before cutting in a state where the holding attachment and the material before cutting are rotating.

* * * * *